United States Patent [19]
Wesch

[11] 3,953,629
[45] Apr. 27, 1976

[54] SYNTHETIC CONCRETE LAMINATE

[75] Inventor: Ludwig Wesch, Heidelberg, Germany

[73] Assignee: Manufacture de Machines du Haut-Rhin-Manurhin S.A., Mulhouse, France

[22] Filed: June 5, 1972

[21] Appl. No.: 259,686

[30] Foreign Application Priority Data
June 11, 1971  Germany.......................... 2129143

[52] U.S. Cl................................. 428/36; 138/140; 156/309; 428/283; 428/304; 428/320; 428/324; 428/406; 428/407
[51] Int. Cl.² ........................................ F16L 9/10
[58] Field of Search................... 161/151, 156, 166; 156/309; 428/36, 283, 304, 320, 324, 406, 407; 138/140

[56] References Cited
UNITED STATES PATENTS
2,850,890  9/1958  Rubenstein............................ 72/36

Primary Examiner—William J. van Balen
Assistant Examiner—James J. Bell
Attorney, Agent, or Firm—Hopgood, Calimafde, Kalil Blaustein and Lieberman

[57] ABSTRACT

A synthetic concrete laminate is disclosed comprising an outer synthetic concrete layer bonded to an intermediate barrier layer comprised of a synthetic resin, the barrier layer being in turn bonded to a carrier layer comprised of a synthetic resin with reinforcing fibers embedded therein.

14 Claims, 4 Drawing Figures

U.S. Patent   April 27, 1976   3,953,629
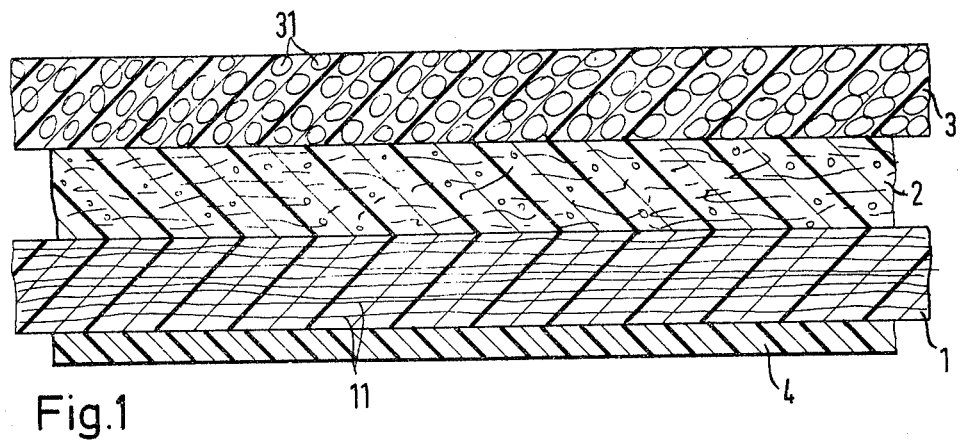
Fig.1
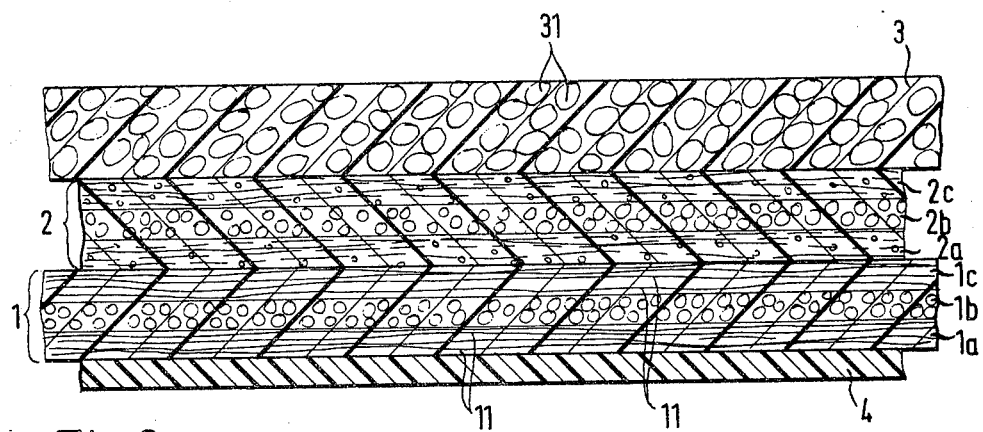
Fig.2
Fig.3
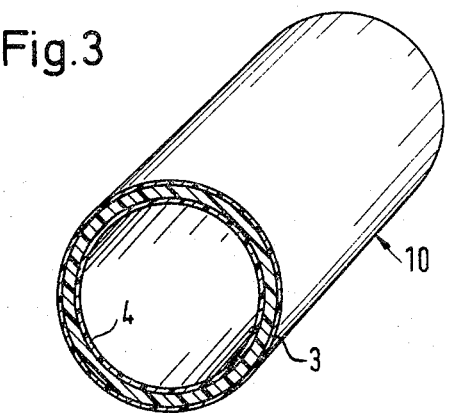
Fig.4
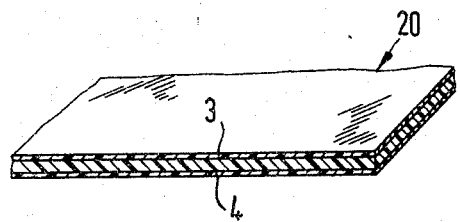

SYNTHETIC CONCRETE LAMINATE

The invention relates to a synthetic concrete laminate having a carrier layer comprising plastics material and fibre reinforcements, an intermediate layer comprising a plastics material, and a synthetic concrete layer comprising plastics material and fillers.

A synthetic concrete laminate of this kind is already known (German published specification No. 1,544,816). The carrier layer consists on the one hand of polyester, epoxy or butadiene copolymer resin and on the other hand of fibre reinforcements. The synthetic concrete layer consists on the one hand of polyethers and/or polyesters containing hydroxyl groups with isocyanates and/or of epoxy resins with polyamides and on the other hand of aggregate materials. The fibres used are glass, asbestos, metal and/or organic fibres or filaments. The aggregates used are more especially quartz, gravel, aluminium oxide, iron oxide, heavy spar, titanium dioxide and/or colouring substances. The synthetic concrete laminate is notable for good elasticity and also high compressive and bending strength, and also can be produced with relatively low manufacturing costs. But it has been found that the mechanical advantages of the synthetic concrete layer are lost again if the synthetic concrete layer has a high proportion of fillers. This may be due amongst other things to the fact that the relatively large filler surface cannot be completely covered with plastics even with the assistance of silanes, unless very complicated processes with the use of a vacuum are used. Air pockets remain, and air is additionally produced in various ways into the plastics material, e.g., by stirring or due to the usual shaking-in of fillers, and some of this air is retained. More especially when storing such synthetic concrete laminates in the open, above all in the case of local atmospheres with concentrations of chemicals, or when laying in particularly acid soils, the synthetic concrete laminate is subjected to ageing, and cracks of varying numbers and sizes form and reduce the mechanical properties which are basically good, more especially elasticity. In the case of materials with a very considerable filler content, it may even happen that some agents pass through the entire synthetic concrete laminate.

The invention aims at obviating such disadvantages. Its basic object is to improve the synthetic concrete laminate without substantially increasing the production costs in such a manner that it is subjected to less ageing and it still has the good mechanical properties that it had directly after being produced even after being used for a relatively long time, more especially when stored in the open and laid in the ground.

The invention consists in that there is used as an intermediate layer a barrier layer having greater elongation or a lower modulus of elasticity (E) than the neighboring layers. It is recommended that the elongation should be at least twice as great or the modulus of elasticity at most about half the value of the corresponding values of the neighboring layers.

The moduli of elasticity of many different kinds of plastics are known. In addition, the moduli of elasticity of very many kinds of materials used as reinforcements, such as for example glass fibres or fillers such as for example quartz sand, are likewise known. Thus, glass fibres have a modulus of elasticity of about $700 \times 10^3$ kp/cm². Quartz sand has a modulus of elasticity of about $0.73 \times 10^3$ kp/cm². The modulus of elasticity of a material consisting of epoxy resin and porcelain powder in the ratio of 1:1 amounts to for example $48.4 \times 10^3$ kp/cm². A layer consisting of glass fibres and epoxy resin has a modulus of elasticity of about $2 \times 10^3$ to $5 \times 10^3$ kp/cm² and a layer consisting of glass fibres and polyesters has a modulus of elasticity between about $0.5 \times 10^3$ and $3.5 \times 10^3$ kp/cm². Owing to the load elongation or high modulus of elasticity of glass fibres it is also known ("Kunststoff-Berator" 1969, Page 274 et seq.), that the modulus of elasticity of a glass fibre mat layer rises from $70 \times 10^3$ kp/cm² with 25% glass fibres to $100 \times 10^3$ kp/cm³ with 50% glass fibres.

Therefore, the person skilled in the art has the capability of so choosing the elongation values or moduli of elasticity of the individual laminate layers by choosing the most suitable plastics, fillers and reinforcing materials, that they obey the precept put forward by the present invention.

It is convenient to construct the barrier layer so that it has an elongation of about 4 percent or more, more especially if the elongation of the synthetic concrete layer amounts to about 1 percent and that of the barrier layer to about 2 percent.

By "elongation" there is understood the elongation determined in a tension test.

Particularly excellent properties are obtained if, with the usual construction and usual composition of the carrier and synthetic concrete layers, the barrier layer has a modulus of elasticity of the order of magnitude of $40 \times 10^3$ to $60 \times 10^3$ kp/cm².

More especially when there are high external pressures, for example in the case of pipes laid deep in the soil, it is expedient to provide the barrier layer with relatively high elongation. It is advisable to use several separate barrier layers or to divide the barrier layer itself into a laminate consisting of two barrier part-layers and a filler layer situated therebetween. The barrier layer or part-layer facing towards the synthetic concrete layer should then have great elongation or a smaller modulus of elasticity than the barrier layer or part-layer facing towards the carrier layer. Surprisingly it has been found that excellent properties can also be achieved if the synthetic concrete layer itself is sub-divided by a barrier layer with relatively great elongation. The individual laminate layers of the synthetic concrete laminate should be so constructed that the carrier layer has the lowest elongation of all the laminate layers. However it is also possible to sub-divide the carrier layer itself into a laminate, of which two part-layers are separated by a filling layer.

The filling layers sub-dividing the barrier layer or the carrier layer, or other filling layers arranged between the individual laminate layers, comprise fillers and plastics material. It is advisable to use crushed quartz sand or other silicates with substantially round grains having a grain size between 0.8 and 5 mm, more especially about 1–2 mm, as fillers. The proportion of fillers in the corresponding filling layers amounts to up to about 80 percent.

The barrier layers can also be provided with reinforcing means. These may be for example fleeces, mats, fabrics and/or rovings. It is recommended that the reinforcing means embedded in plastics material be arranged in laminated manner and that organic reinforcing materials always be made to alternate with inorganic reinforcing materials. Suitable plastics material for the barrier layers can include more especially elastomeric plastics material, including synthetic rubber and thermoplastics.

The invention can be used in a particularly satisfactory way for pipes which are to be laid in underground water, or covering panels. Such pipes are often laid up to depth of more than 10 m and are also used in the case of wells with external pressures up to more than 100 atmospheres excess pressure. Such pipes can also be used in marshes and tidal flats without any risk that after a fairly long time the mechanical properties of the synthetic concrete laminate will be impaired or the pipes will begin to leak. It is of course also possible to assemble sewage pipe lines from such pipes, more particularly those which have to conduct corrosive chemicals or water with a salt content. It is advisable in these cases to provide the pipes with a covering or lining at the inner side, that is to say directly at the free surface of the carrier layer. The synthetic concrete laminate can be worked or formed not only into pipes but also to constitute containers of any shape.

The invention is also suitable for the manufacture of shells for use in industrial fields.

Constructional examples of the invention are explained in detail hereinafter with reference to the drawings wherein:

FIGS. 1 and 2 show partial sectional views of a synthetic concrete laminate,

FIG. 3 shows diagrammatically a seamless pipe made from the synthetic concrete laminate and FIG. 4 shows diagrammatically a panel made from the synthetic concrete laminate.

According to FIG. 1, the synthetic concrete laminate consists of a carrier layer 1 which is provided with fibre reinforcements 11, which consist of fabric, mats, chopped pieces or plaited structures of endless filaments or rovings. The plastics material of the carrier layer 1 can also be provided with fillers. Above the carrier layer 1 there is connected securely thereto the barrier layer 2 which has a high elongation relatively to the carrier layer 1. In it there are provided more especially organic filaments of high elongation in a mixture with plastics material of high elongation. The proportion of organic filaments is not to exceed 50 percent and amounts expediently to between 25 and 30 percent. A preferred mixture of the barrier layer is as follows:

30 percent resin
30 percent filaments of organic nature as a fleece
20 percent filaments of an inorganic nature as a fleece
20 percent filler as silicate below a grain size of 0.8 mm.

Depending on the requirements as regards the elongation of the barrier layer, it is possible to provide this also with only one reinforcement or aggregate, such as organic, inorganic, metallic or ceramic filaments. Suitable fillers both in the barrier layer and also in all other layers are ground fibres of glass (i.e., milled fibres), of asbestos or of ceramic material (in general of organic and/or inorganic nature). Above the barrier layer 2 there is provided, likewise connected securely thereto, the synthetic concrete layer 3 which can be between about 1 and 20 mm in thickness. Greater wall thicknesses for the synthetic concrete layer 3 are also acceptable. This is particularly advisable in the case of pipes subjected to a high pressure at the crown and a nominal width of more than 1 m. The fillers 31 which are embedded in the plastics material of the synthetic concrete layer 2 are only shown diagrammatically. As a rule the proportion of fillers in the synthetic concrete layer 3 is greater than shown diagrammatically in the illustration. The free surface of the carrier layer 1 is covered with a covering 4 which consists of synthetic resin which may be provided with fibre reinforcements and/or enriched with fillers. Such coverings 4 are also known in the form of so-called gelcoats. The coverings 4 may also be formed of elastomers, PVC, polyethylene, polypropylene and other plastics.

The carrier layer 1 is expediently sub-divided into a laminate of its own — of course connected securely to the barrier layer 2 and the covering 4 — which has at the external sides, near the neighbouring layers, fibre-reinforced part-layers 1a, 1c and, therebetween, a filling layer 1b filled with silicates, more especially quartz sand. The quartz sand should have round grains of a particle size of about 0.6 to 1.2 mm and is to be embedded as homogeneously as possible in the plastics material which is used as binder. The specific gravity can be reduced by filling with foamed inorganic and/or organic materials such as expanded clay and foamed glass.

According to FIG. 2 not only the carrier layer 1 but also the barrier layer 2 consists of a laminate of sandwich type. Of course the layers of the entire synthetic concrete laminate, consisting of the covering 4, the carrier layer 1, the barrier layer 2 and the synthetic concrete layer 3 are connected securely to one another.

The construction of such a synthetic concrete laminate in the form of a pipe is carried out more especially as follows:

A polyester fleece (KG 1751 of Messrs. Freudenberg, of Weinheim) is wound about a mandrel with a 50 percent overlap. A polyester resin consisting of 80 percent P 8 of BASF, Ludwigshafen, and 20 percent of E 200 by the same firm is provided in such a manner with activators and accelerators that the resin applied to the polyester fleece gels in about 15 minutes and forms the covering 4.

On the covering 4, which is to be regarded as the base layer in this case, there is applied in a filament winding process a layer of a roving of 60 strands impregnated with polyester resin, by a cross-winding method. The basic resin P 8 mentioned hereinbefore is used as the said resin in the usual mixture with activators and accelerators. The thickness of the first part-layer 1a is determined by the mechanical requirements expected of the pipe; it itself can consist of several individual layers. The rovings applied by a cross-winding method form the reinforcements 11.

Over this there is used a filling layer 1b with quartz sand of round grains having a grain size of 0.6 to 1.2 mm. It is sufficient to scatter the grains into the excess synthetic resin residue of the first part-layer 1a of the carrier layer 1, or to apply them with a blowing process. If this filling layer 1b is to be of greater thickness, it is advisable to use the usual resin spraying method, wherein the grains are blown into the resin stream and applied therewith to the part-layer 1a with the mandrel or pipe rotating. The higher the degree of filling in the filling layer 1b, the more elastic must this layer be made.

The other part-layer 1c of the carrier layer 1 has the same construction as the first part-layer 1a. Instead of cross-winding it is also possible to use radial winding of the rovings.

The first part-layer 2a of the barrier layer 2 is constructed on a polyester fleece (KT 17 51 by Messrs. Freudenberg, of Weinheim) with 10 percent overlap. Over this layer there is laid a glass fleece (for example by Messrs. Schuller, Wertheim) with a thickness of 0.3 or 0.5 mm, and these fleeces are impregnated and consolidated with resin, more particularly the mixed resin mentioned for the covering 4.

The filling layer 2b of the barrier layer 2 corresponds in construction to the filling layer 1b of the carrier layer 1.

The second part-layer 2c of the barrier layer 2 corresponds in construction to the first part-layer 2a of the barrier layer 2.

The outer synthetic concrete layer 3 of the synthetic concrete laminate constructed as a pipe has crushed sand of a grain size between about 0.8 and 2mm, which is applied in the manner of the part-layer 1b of the carrier layer 1 for example. If the synthetic concrete layer 3 exceeds a thickness of 2mm, this layer is produced by a spraying method. It is also possible to use the so-called pressing-on method, with a preceding synthetic concrete mixing machine.

The following are the moduli of elasticity of the individual laminate layers expressed in kp/cm$^2$:

| | |
|---|---|
| Covering 4 | $20 \times 10^3$ |
| Part-layer 1a of the carrier layer 1 | $120 \times 10^3$ |
| Filling layer 1b of the carrier layer 1 | $80 \times 10^3$ |
| Part-layer 1c of the carrier layer 1 | $120 \times 10^3$ |
| Part-layer 2a of the barrier layer 2 | $60 \times 10^3$ |
| Filling layer 2b of the barrier layer 2 | $80 \times 10^3$ |
| Part-layer 2c of the barrier layer 2 | $40 \times 10^3$ |
| Synthetic concrete layer 3 | $70 \times 10^3$ |

This shows that the moduli of elasticity of the part-layers 2a and 2c of the barrier layer 2 are always lower, and in fact considerably lower than those of the neighbouring layers. The outer part-layer 2c of the barrier layer 2, facing towards the synthetic concrete layer 3, has a lower modulus of elasticity than the other part-layer 2a of the barrier layer 2.

Instead of the aforesaid composition it is also possible to use the following composition and the following construction for example for the constructional example of FIG. 2:

The covering 4 is made from an epoxy resin which has a mixture of 600 parts by weight of LY 556 by Ciba of Basel, as resin,
60 parts by weight of HY 951 by the same firm, as hardener, and
400 parts by weight of VE 2082+ by Rutag, Meiderich, as resin, and
56 parts by weight N++ of the same firm as plasticizing hardener (++).

The part-layer 1a is made from 70 percent glass fibres and 30 percent epoxy resin of the following mixture:

100 parts by weight of LO2* by Rutag, Meiderich, as resin, and
110 parts by weight HT** by the same firm as hardener.

+low-viscosity, fully reactive epoxy resin.
++ethylamino piperazine.
*epoxy resin which contains 20 percent of a cycloaliphatic thinner and 2 parts per thousand of an additive which reduces the surface tension.
**unmodified dicarboxylic acid anhydride which is liquid at room temperature.

The filling layer 1b is made of 50 percent epoxy resin of the same mixture as the part-layer 1a and 50 percent round-grain quartz sand with a grain size between 0.6 and 1.2 mm.

The part-layer 1c corresponds to the part-layer 1a.

The part-layer 2a of the barrier layer 2 with a total thickness of 0.8 mm is applied in the form of an elastomeric liner, consisting of for example an acrylonitrile-butadiene-PVC copolymer having a thickness of 0.4 mm, with 50 percent overlap, by winding, onto the part-layer 1 c situated below. The elongation on fracture is still at least 100 percent after vulcanization in the laminate.

The filling layer 2b corresponds again to the filling layer 1b.

The part-layer 2c of the barrier layer 2 corresponds to the other part-layer 2a of the barrier layer 2.

The synthetic concrete layer consists of 80 percent by volume of crushed quartz having a grain size between 0.8 and 2mm and also 20 percent by volume of epoxy resin of the composition mentioned regarding the part-layer 1a of the carrier layer 1. The curing of the epoxy resin is carried out at 150°C together with the vulcanization of the elastomeric plastics material.

The individual layers of the first example may also be combined with individual layers of the second example. If in the first example there is used a PVC-containing elastomer, it is necessary for this purpose to use in the neighbouring layers polyester resins specially adapted for PVC, for example the plastics material A 410 by BASF, Ludwigshafen.

FIG. 3 shows in perspective view a pipe 10 of this kind which is noted for its excellent strength and good elastic behavior even under high pressures and also for its good resistance to ageing, and can easily be laid in ground water even if it is salt-containing. The synthetic concrete layer 3 is situated outside and the covering 4, along which the medium conducted through the pipe 10 flows, at the inside.

According to FIG. 4 the synthetic concrete laminate is constructed as a panel 20 whose outer sides consist of on the one hand the covering 4 and on the other hand the synthetic concrete layer 3.

Conveniently, fibres of glass, asbestos, metal, graphite and/or other organic and/or inorganic filaments and threads are used as the reinforcements. As fillers, possibly in mixture with inorganic and/or organic milled fibres, all silicates are suitable, more especially in the form of quartz sand, and also heavy spar, titanium dioxide, talc, carbonates and also coloring substances. Fillers in expanded form such as expanded clay can also be used.

As plastics material there may be used more especially synthetic resins and above all thermosetting plastics and also compounds having a base of hydroxyl-group-containing polyesters and/or polyethers with isocyanates.

It is surprising that the preferred mechanical properties can be achieved even with a glass content of the order of magnitude of 5%, whilst the remainder consists of fillers and plastics material more particularly synthetic resin. This is also true of fibres other than glass fibres so that the production costs are relatively low. The synthetic concrete laminate can also be formed as curved sections and laid as such in sewers.

The indications of percentage are always intended to be percent by weight unless otherwise indicated.

The following are two examples for the construction of a pipe as shown in FIG. 3 using the lamination arrangement of FIG. 2.

EXAMPLE 1

Covering 4

Gelcoat of the unsaturated polyester PALATAL P 8 (highly reactive polyester resin, medium viscosity, with a styrene content of 34 percent ± 2 percent (percent by weight)) with polyester fleece and a so-called microlith fleece with suitable activators and accelerators.

Carrier Layer 1

The part-layer 1a consists of a cross-winding layer of a roving with 60 strands (known in French as "bouts") which is impregnated with the aforesaid PALATAL P 8 and suitable activators and accelerators. The filling layer 1b consists of a layer (6–10 mm thick) of synthetic concrete of a mixture of 80 percent of the aforesaid PALATAL P 8 and 20 percent of E 200 of BASF Ludwigshafen (low-viscosity, low-reactive unsaturated polyester resin which forms flexible shapes with the addition of suitable reagents; styrene content 35 percent ± 2 percent (percent by weight)) and also quartz sand with 1.0 to 2.0 mm round grain with a mixture ratio of resin : sand = 1 : 4.

The part-layer 1c consists of a layer of an 85° radial winding with a roving of 60 strands and the resin PALATAL P 8. The part-layer 1c is applied at the same time as the filling layer 1b, the synthetic concrete mixture being extruded from a nozzle onto the roving strands of the radial winding.

Barrier Layer 2

The part-layer 2a consists of a layer of a cross-winding like the part-layer 1a. The filling layer 2b with a thickness of 3—5 mm consists of a layer of synthetic concrete like the filling layer 1b. The part-layer 2c consists of a layer of a radial winding like the part-layer 1c; here again the filling layer 2b and the part-layer 2c, like the filling layer 1b and the part-layer 1c, are applied simultaneously.

An additional barrier layer 2

One layer each of polyester fleece and microlith fleece with the plastics material PALATAL P 8 corresponding to the covering 4 are applied directly to the barrier layer 2.

Synthetic concrete layer

A layer of synthetic concrete is applied by sprinkling crushed sand onto the excess synthetic resin of the additional barrier layer 2.

EXAMPLE 2

Covering 4

Instead of the unsaturated polyester resin PALATAL P 8 of the covering 4 of Example 1, in this case the synthetic resin A 410 (medium-reactive isophthalic acid polyester reaction resin styrene content 43 percent ± 2 percent (percent by weight)) by BASF Ludwigshafen is used.

Carrier layer 1

The carrier layer is produced just as in Example 1 but the filling layer 1b has resin : sand : foamed glass = 1:2:2.

Barrier layer 2

The barrier layer 2 is produced just as in Example 1.

Additional barrier layer 2

The additional barrier layer 2 is constructed just as in Example 1 but the filling layer 2b as filling layer 1b in Example 2.

Synthetic concrete layer 3

After the hardening of the preceding layers, a layer of a polyester containing hydroxyl groups and isocyanate with crushed sand is applied.

I claim:

1. A synthetic concrete laminate comprising essentially an outer synthetic concrete layer bonded to an intermediate barrier layer comprised of a synthetic resin, said barrier layer being in turn bonded to a carrier layer comprised of a synthetic resin with reinforcing fibers embedded therein, said barrier layer being formed of a laminate of plural layer portions comprising a first outer barrier layer portion which is bonded to said concrete layer, an intermediate barrier layer portion and a second outer barrier layer portion which is bonded to said carrier layer, said intermediate layer portion being comprised of filler material and a synthetic resin, said first and second outer barrier layer portions bonded respectively to said concrete layer and to said carrier layer being characterized by the property of having a greater percent of elongation in tension and lower modulus of elasticity than either of said concrete and said carrier layers.

2. The synthetic concrete laminate of claim 1, wherein said carrier layer is formed of a laminate of plural layer portions comprising a first outer carrier layer portion bonded to said second barrier layer portion, an intermediate carrier layer portion and a second outer carrier layer portion, said intermediate carrier layer portion being comprised of filler material and a synthetic resin.

3. The synthetic concrete laminate of claim 2, wherein said first and second outer carrier layer portions are characterized by the lowest elongation and the highest modulus of elasticity of all the laminate layers.

4. The synthetic concrete laminate of claim 3, wherein the free surface of said second outer carrier layer portion has bonded to it a covering of a synthetic resin.

5. A synthetic concrete laminate comprising essentially an outer synthetic concrete layer bonded to an intermediate barrier layer comprised of synthetic resin, said barrier layer being in turn bonded to a carrier layer comprised of a synthetic resin, with reinforcing fibres embedded therein, said barrier layer being formed of a laminate of plural layer portions, comprising a first outer barrier layer portion which is bonded to said concrete layer, an intermediate barrier layer portion and a second outer barrier layer portion which is bonded to said carrier layer, said intermediate barrier layer portion being comprised of filler material and a synthetic resin, said carrier layer being formed of a laminate of plural layer portions comprising a first outer carrier layer portion bonded to said second barrier layer portion, an intermediate carrier layer portion and a second outer carrier layer portion, said intermediate carrier layer portion being comprised of a filler material and a synthetic resin, said first and second outer barrier layer portions bonded respectively to said concrete layer and to said first outer carrier layer portion being characterized by the property of having a greater percent of elongation in tension and lower modulus of elasticity than either of said concrete and said carrier layers.

6. The synthetic concrete laminate of claim 5, wherein said filler material is an inorganic silicate having substantially rounded grains of size ranging from about 0.8 to 5 mm.

7. The synthetic concrete laminate of claim 5, wherein the filler material employed in the intermediate barrier layer portion and the intermediate carrier layer portion is crushed quartz sand.

8. The synthetic concrete laminate of claim 5, wherein the amount of filler material in said intermediate barrier and carrier layer portions ranges up to about 80 percent by weight.

9. The synthetic concrete laminate of claim 5, wherein the barrier layers contain reinforcing fibres therein.

10. The synthetic concrete laminate of claim 9, wherein the reinforcing fibres are employed in a form selected from the group consisting of fleeces, mats, fabrics and rovings.

11. The synthetic concrete laminate of claim 10, wherein the reinforcing fibres in said laminate comprises an alternate arrangement of organic and inorganic fibre materials.

12. The synthetic concrete laminate of claim 11, wherein the barrier layers comprise elastomeric resins.

13. The synthetic concrete laminate of claim 5, wherein said laminate is in the form of a tubular article.

14. The synthetic concrete laminate of claim 5, wherein said laminate is in the form of a panel.

* * * * *